(12) United States Patent
Lundgren

(10) Patent No.: US 11,168,464 B2
(45) Date of Patent: Nov. 9, 2021

(54) OPEN CENTER HYDRAULIC SYSTEM AND VALVE

(71) Applicant: NORDHYDRAULIC AB, Kramfors (SE)

(72) Inventor: Bertil Lundgren, Bjaertra (SE)

(73) Assignee: NORDHYDRAULIC AB, Kramfors (SE)

( * ) Notice: Subject to any disclaimer, the term of this patent is extended or adjusted under 35 U.S.C. 154(b) by 76 days.

(21) Appl. No.: 16/629,610

(22) PCT Filed: Jul. 9, 2018

(86) PCT No.: PCT/EP2018/068544
§ 371 (c)(1),
(2) Date: Jan. 9, 2020

(87) PCT Pub. No.: WO2019/011859
PCT Pub. Date: Jan. 17, 2019

(65) Prior Publication Data
US 2021/0148384 A1    May 20, 2021

(30) Foreign Application Priority Data

Jul. 14, 2017 (SE) .................................... 1750922-5
Jul. 14, 2017 (SE) .................................... 1750923-3

(51) Int. Cl.
*E02F 9/22* (2006.01)
*F15B 1/02* (2006.01)
(Continued)

(52) U.S. Cl.
CPC ............ *E02F 9/2267* (2013.01); *F15B 1/021* (2013.01); *F15B 11/042* (2013.01); *F15B 13/08* (2013.01);
(Continued)

(58) Field of Classification Search
CPC .. F15B 1/021; F15B 15/20; F15B 9/00; F15B 2211/30525; F15B 2211/88;
(Continued)

(56) References Cited

U.S. PATENT DOCUMENTS 6,173,572 B1  1/2001  Cobo et al.
7,036,421 B2  5/2006  Joergensen
(Continued)

FOREIGN PATENT DOCUMENTS

EP    1 209 365    5/2002
EP    1 403 527    3/2004
(Continued)

OTHER PUBLICATIONS

International Search Report dated Jan. 25, 2019 in International (PCT) Application No. PCT/EP2018/068544.
(Continued)

*Primary Examiner* — Abiy Teka
*Assistant Examiner* — Daniel S Collins
(74) *Attorney, Agent, or Firm* — Wenderoth, Lind & Ponack, L.L.P.

(57) ABSTRACT

An open center hydraulic system (100) includes a tank configured to hold hydraulic fluid, a pump configured to provide pressurized hydraulic fluid from the tank, and a shunt valve configured to adapt a first opening area between a first input port and a first output port of the shunt valve dependent on a first control signal. The first input port is coupled to the pump, and the first output port is coupled to the tank. A first actuator valve is coupled to the first input port and configured to adapt a second opening area of the first actuator valve dependent on a second control signal. A hydraulic valve control unit is configured to determine a first opening area value and a second opening area value based on user input data and a predetermined relation dependent
(Continued)

on the user input data, sending the first control signal, indicative of the first opening area value and sending the second control signal indicative of the second opening area value.

17 Claims, 13 Drawing Sheets

(51) Int. Cl.
  *F15B 11/042* (2006.01)
  *F15B 13/08* (2006.01)
  *F15B 15/20* (2006.01)
  *F15B 19/00* (2006.01)
  *F15B 21/08* (2006.01)
  *F16K 11/00* (2006.01)

(52) U.S. Cl.
  CPC .............. *F15B 15/20* (2013.01); *F15B 19/00* (2013.01); *F15B 21/08* (2013.01); *F16K 11/00* (2013.01); *E02F 9/2203* (2013.01); *E02F 9/2217* (2013.01); *F15B 2211/20576* (2013.01); *F15B 2211/30525* (2013.01); *F15B 2211/327* (2013.01); *F15B 2211/6346* (2013.01); *F15B 2211/6654* (2013.01); *F15B 2211/7053* (2013.01)

(58) Field of Classification Search
  CPC ...... F15B 2211/625; F15B 2211/41536; E02F 9/2267; F16K 11/00
  See application file for complete search history.

(56) References Cited

U.S. PATENT DOCUMENTS

| | | |
|---|---|---|
| 2002/0070071 A1 | 6/2002 | Schuh |
| 2004/0055288 A1 | 3/2004 | Pfaff et al. |
| 2014/0016038 A1 | 5/2014 | Pfaff et al. |
| 2014/0178164 A1* | 6/2014 | Peterson ................. E02F 3/432 |
| | | 414/685 |
| 2018/0180068 A1* | 6/2018 | Fukuda ................. E02F 9/2217 |

FOREIGN PATENT DOCUMENTS

| | | |
|---|---|---|
| JP | 60-175804 | 9/1985 |
| WO | 02/46021 | 6/2002 |

OTHER PUBLICATIONS

Swedish Examination Report dated Feb. 12, 2018 in Sweden Patent Application No. 1750922-5.
Swedish Examination Report dated Apr. 2, 2019 in Sweden Patent Application No. 1750923-3.

* cited by examiner

OPEN CENTER HYDRAULIC SYSTEM AND VALVE

FIELD OF THE INVENTION

The present invention relates to an open center hydraulic system and a valve for the open center hydraulic system.

BACKGROUND OF THE INVENTION

Hydraulic system for vehicles typically comprises a pump, a tank and one or more valve assemblies comprising a shunt valve and an actuator valve coupled to the shunt valve. The actuator valve is typically controlling a corresponding actuator's position. Open center hydraulic system is often used to denote such a system where the hydraulic fluid is constantly flowing from the pump to the tank, regardless if the actuator is activated or not. The pump is typically powered by the vehicles engine and is therefore providing a relatively constant fluid flow, though varying with the engines revolutions per minute, RPM. In a typical open center hydraulic system, a valve assembly is assigned to each hydraulic function controlled by a hydraulic actuator. In other words, the valve assembly functionality, such as meter in control of the hydraulic actuator and/or meter out control of the hydraulic actuator, is typically controlled simultaneously with the shunt control. This functionality may be implemented in the same valve spool. Effectively, this means that the relative relation between the opening area of the spool valve and the opening area of the meter in and/or meter out valve is fixed once the valve assembly is manufactured. A disadvantage of such conventional hydraulic systems is that the functionality of the valve assembly is always mutually dependent.

In conventional hydraulic systems, the valves of all hydraulic functions are typically centralized at one point, e.g. in the cabin of a vehicle. A drawback of such systems may be that a large amount of hydraulic hoses are required to connect each hydraulic function to a respective valve, even though the hydraulic actuators of the hydraulic functions are arranged next to each other, e.g., a tilt function and a third function of a front loader.

In some conventional hydraulic systems, uncontrolled cylinder movement in the event of a pipe rupture or hose break is prevented by introducing line rupture protection valves, check valves or burst pipe protection valves. This prevention has the drawback of adding additional complexity and cost to the hydraulic system.

In some conventional hydraulic systems, a part of the total flow of hydraulic fluid from the pump is always provided to dual action hydraulic actuators, even when other forces such as gravity are sufficient to move the actuator.

Thus, there is a need for an improved open center hydraulic system and a hydraulic valve for the open center hydraulic system.

SUMMARY OF THE INVENTION

An objective of embodiments of the present invention is to provide a solution which mitigates or solves the drawbacks and problems described above.

The above objectives are basically solved by the subject matter described herein.

According to a first aspect of the invention, the above mentioned and other objectives are achieved with an open center hydraulic system. The open center hydraulic system comprises a first hydraulic actuator, a tank configured to hold hydraulic fluid, a pump configured to provide pressurized hydraulic fluid from the tank, a shunt valve configured to adapt a first opening area between a first input port and a first output port of the shunt valve dependent on a first control signal. The first input port is coupled to the pump, and the first output port is coupled to the tank. A first actuator valve is coupled to the first input port and configured to adapt a second opening area of the first actuator valve dependent on a second control signal. A hydraulic valve control unit is configured to determine a first opening area value and a second opening area value based on user input data and a predetermined relation dependent on the user input data, sending the first control signal, indicative of the first opening area value and sending the second control signal indicative of the second opening area value.

According to a second aspect of the invention, the above mentioned and other objectives are achieved with an actuator valve. The actuator valve comprises a pump port configured to receive hydraulic fluid from a pump, a first actuator port configured to provide or receive hydraulic fluid, a second actuator port configured to provide or receive hydraulic fluid, a tank port configured to provide or receive hydraulic fluid to a tank, a valve spool configured to adapt an opening area between the pump port and the first actuator port when positioned within a first position range along a longitudinal axis or to adapt an opening area between the pump port and the second actuator port when positioned within a second position range along the longitudinal axis and a valve servo unit configured to move the valve spool along the longitudinal axis dependent on a control signal.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

The expressions desired actuator's position, desired actuator's movement and desired actuator's speed is used interchangeably herein.

Figure 1:
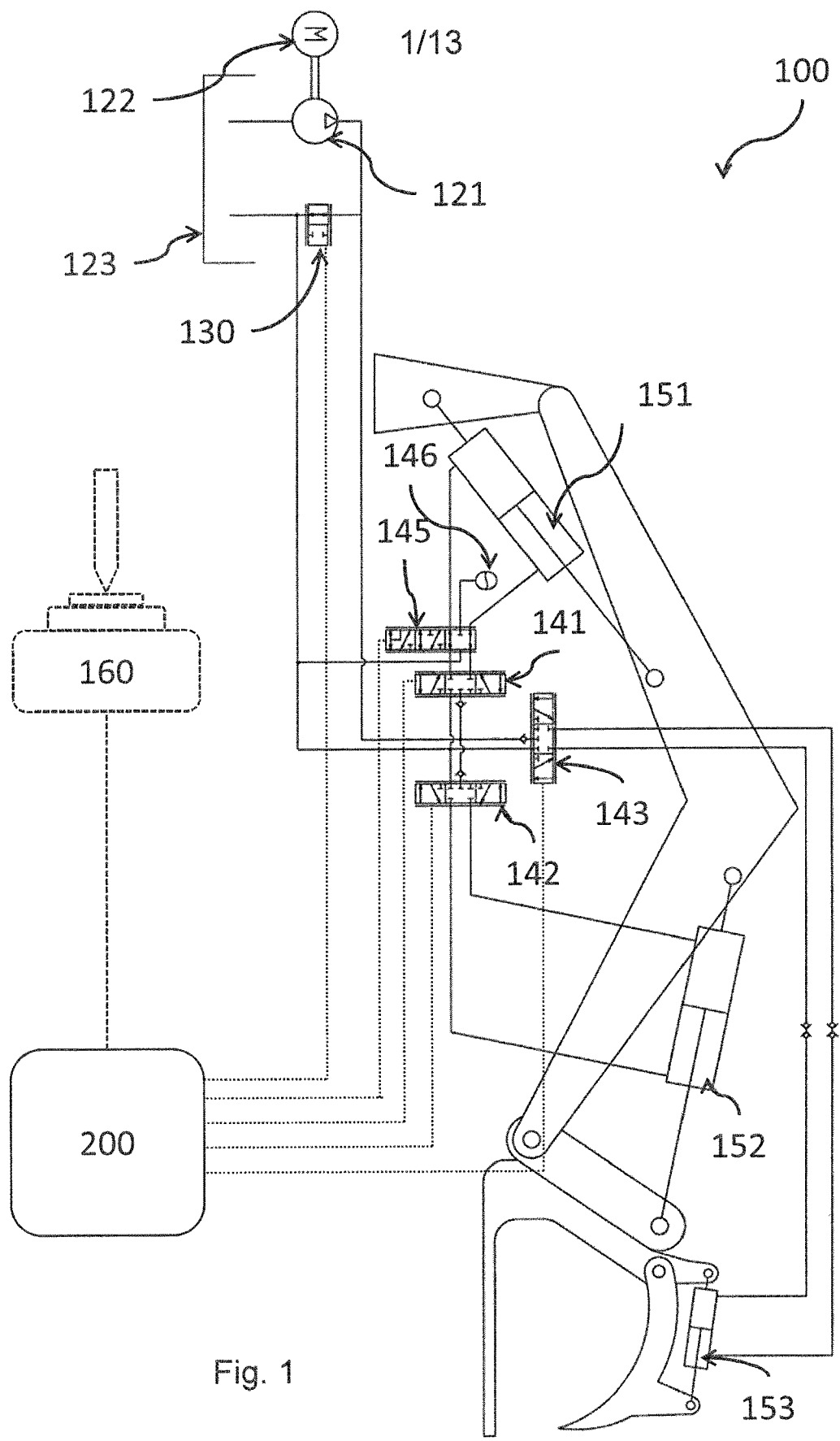
FIG. 1 is a schematic diagram of an open center hydraulic system according to one or more embodiments of the Invention.

FIG. 1 shows an open center hydraulic system 100 according to an embodiment of the invention. The open center hydraulic system 100 comprises a hydraulic valve control unit 200, a shunt valve 130 and one or more actuator valves 141-143. Each of the one or more actuator valves 141-143 may control corresponding portions of actuators 151-153, e.g. the position of a hydraulic cylinder configured to move from a first end position to a second end position. The shunt valve 130 and the one or more actuator valves 141-143 are each provided with a valve servo unit (not shown in the figure). Each valve servo unit comprises control circuitry, such as a processor and a memory, and an electric actuator controlled by the control circuitry configured to control the respective valve, e.g. to move a valve spool in the valve. The control circuitry of the valve servo unit controls the respective electric actuator based on a control signal received from the hydraulic valve control unit 200. The hydraulic valve control unit 200 is communicatively coupled to the valve servo unit of the shunt valve 130 and to each of the valve servo units of the one or more actuator valves 141-143.

The hydraulic valve control unit 200 is configured to send one or more control signals to valves comprising a valve servo unit in response to a control signal received from an input device 217. The input device is typically configured to receive input or indications from a user indicative of at least a desired position for a respective actuator 151-153 and send a control signal or user-input signal indicative of the user input or indications to the hydraulic valve control unit 200.

The open center hydraulic system 100 comprises the hydraulic fluid pump 121, one or more actuators 151-153, a hydraulic fluid tank 123 and an engine 122 powering the pump 121.

The input port of the shunt valve 130 is coupled to the output port of a pump 121 and to each of the one or more actuator valves 141-143. The output port of the shunt valve 130 is coupled to the tank 123. The shunt valve 130, and thus effectively the output port of the pump 121, are coupled directly to an actuator valve 141-143 in a meter in configuration and/or coupled to the actuator valve 141-143 in a meter out configuration. Each of the one or more actuator valves 141-143 are coupled to a respective actuator 151-153 in a meter in configuration and/or in a meter out configuration depending on the application.

The open center hydraulic system 100 further comprises one or more function valves 145 coupled in between an actuator valve 141-143 and it's corresponding actuator 151-153. The function valve 145 is configured to be activated or deactivated in response to a control signal received from the hydraulic valve control unit 200, e.g. comprising an electric controllable valve coupled to an accumulator 146. When activated, the accumulator 146, e.g. comprised in or coupled to the function valve 145, dampens variations in hydraulic fluid pressure, e.g. using spring loaded accumulator 146.

Figure 2:
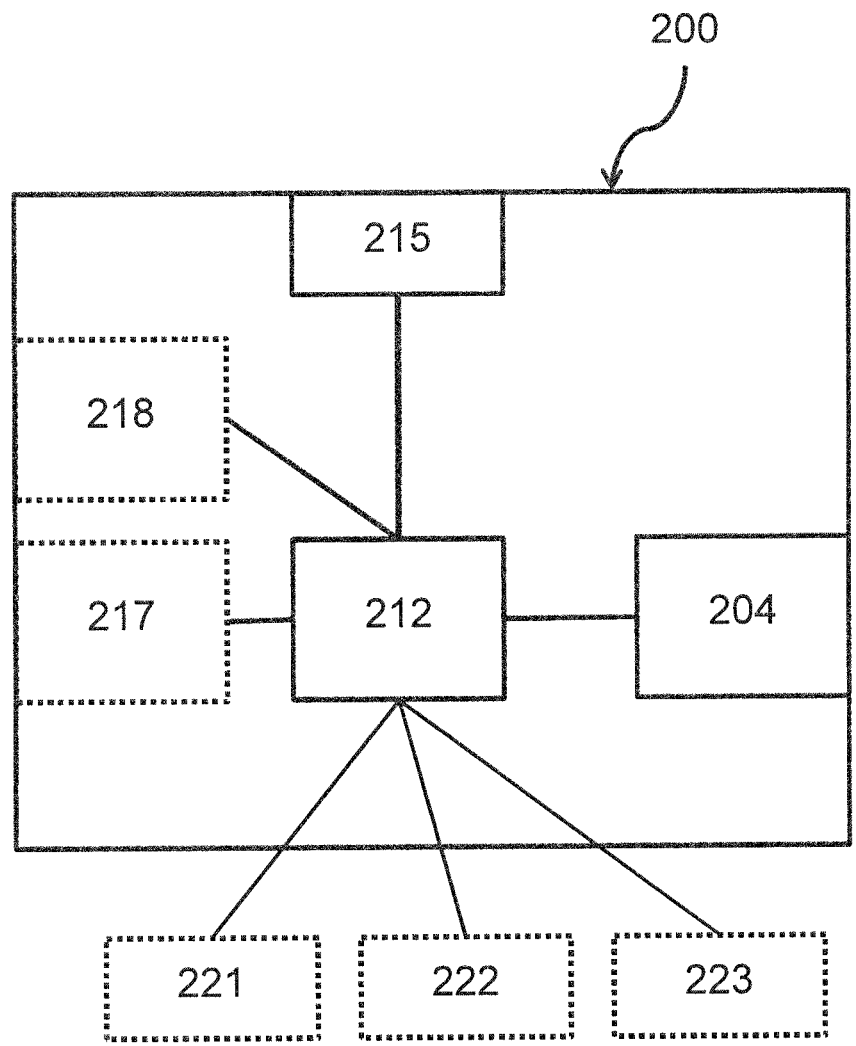
FIG. 2 is a schematic diagram of the hydraulic valve control unit of FIG. 1.

FIG. 2 shows a hydraulic valve control unit 200 according to an embodiment of the invention. The hydraulic valve control unit 200 may be in the form of an Electronic Control Unit, a server, an on-board computer, a vehicle mounted computer system or a navigation device. The hydraulic valve control unit 200 may comprise a processor or processing means 212 communicatively coupled to a transceiver 204 for wired or wireless communication. Further, the hydraulic valve control unit 200 may further comprise at least one optional antenna (not shown in figure). The antenna may be coupled to the transceiver 204 and is configured to transmit and/or emit and/or receive a wireless signals, e.g. in a wireless communication system, e.g. send/receive control signals and/or sensor data to/from the one or more environment sensors 221-223 or any other control unit or sensor. In one example, the processor 212 may be any of a selection of processing circuitry and/or a central processing unit and/or processor modules and/or multiple processors configured to cooperate with each-other. Further, the hydraulic valve control unit 200 may further comprise a memory 215. The memory 215 may contain instructions executable by the processor to perform the methods described herein.

The processor 212 may be communicatively coupled to a selection of any of the transceiver 204, the one or more environment sensors 221-223 and the memory 215. The hydraulic valve control unit 200 may be configured to send/receive the control signals and/or the sensor data directly from the one or more environment sensors 221-322 or one or more actuator valves 141-143 or via a wired and/or wireless communications network.

In one or more embodiments, the hydraulic valve control unit 200 may further comprise an input device 217, configured to receive input or indications from a user and send a control signal or user-input signal indicative of the user input or indications to the processing means 212.

In one or more embodiments the hydraulic valve control unit 200 may further comprise a display 218 configured to receive a display signal indicative of rendered objects, such as text or graphical user input objects, from the processor 212 and to display the received signal as objects, such as text or graphical user input objects.

In one embodiment the display 218 is integrated with the user input device 217 and is configured to receive a display signal indicative of rendered objects, such as text or graphical user input objects, from the processing means 212 and to display the received signal as objects, such as text or graphical user input objects, and/or configured to receive input or indications from a user and send a user-input signal indicative of the user input or indications to the processor 212.

In embodiments, the processor 212 is communicatively coupled to a selection of any of the memory 215 and/or the communications interface and/or transceiver and/or the input device 217 and/or the display 218 and/or the one or more environment sensors 221-223 and/or one or more actuator valves 141-143. In embodiments, the transceiver 204 communicates using wired and/or wireless communication techniques.

In embodiments, the one or more memories 215 may comprise a selection of a hard RAM, disk drive, a floppy disk drive, a flash drive or DVD drive (R or RW), or other removable or fixed media drive or memory. In a further embodiment, the hydraulic valve control unit 200 may further comprise and/or be coupled to one or more additional sensors (not shown in the figure) configured to receive and/or obtain and/or measure physical properties pertaining to the open center hydraulic system 100 and send one or more sensor signals indicative of the physical properties to the processing means 212, e.g. second sensor data indicative of ambient temperature around the open center hydraulic system.

The hydraulic valve control unit 200 may be configured to alternatively or additionally obtain sensor data by calculating the sensor data based on received and/or retrieved sensor data, e.g. received and/or retrieved from the one or more environment sensors 221-223, such as a hydraulic flow sensor 221-223 or engine 122 RPM sensor.

The control signals and/or the sensor data may be sent/received directly to/from a management server, directly to/from the shunt valve 130 or directly to/from the one or more actuator valves 141-143 or directly to/from the one or more environment sensors 221-223 or via the wired and/or wireless communications network. A wireless communications network may comprise e.g. any of a Bluetooth, WiFi 802.11X, GSM, UMTS, LTE or LTE advanced communications network or any other wired or wireless communication network known in the art.

In an embodiment, the hydraulic valve control unit 200 is configured to obtain user input data indicative of at least a desired actuator's 151-153 position. User input data may be obtained by receiving a control signal or a user-input signal S1 comprising the user input data from the input device 217, e.g. a joystick, keyboard, touchscreen, button or any other suitable input device 217 known in the art. Alternatively or additionally, the user input data may be obtained by retrieving the user input data from memory, e.g. memory 215. In one example, a pre-programmed motion pattern for an actuator is retrieved from memory. Alternatively or additionally, the user input data may be obtained by calculating the user input data based on sensor data and/or data retrieved from memory. In an embodiment, the hydraulic valve control unit 200 is configured to obtain user input data indicative of operational mode, e.g. low flow operational mode, single action operational mode and depressurization operational mode, e.g. obtained by a button being pressed.

In one example, the user moves a joystick from a central idle position or at 0% all the way forward or to 100%, thereby indicating he wants an associated hydraulic actuator to be moved at full speed towards an end position. Associating the input device 217 to hydraulic actuators is known in the art, e.g. via a data structure such as a table, and is not further discussed herein. User input data indicative of this desired position or positions is/are then sent as a control signal S1 from the joystick or input device 217 to the hydraulic valve control unit 200.

The hydraulic valve control unit 200 is configured to obtain a predetermined relation, e.g. by retrieving the predetermined relation from memory. The predetermined relation is indicative of opening area of the shunt valve 130 and the one or more actuator valves 141-143 based on the user input data. The user input data is, as previously described, indicative one or more desired positions of one or more of the actuators 151-153. Thus, the predetermined relation is indicative of the opening area of the shunt valve 130 and the opening area of the one or more actuator valves 141-143 based on a single desired position, e.g. X %, or a plurality of desired positions, e.g. X %, Y %, Z %. The plurality of desired positions X %, Y %, Z % may e.g. be provided by multiple joysticks or multi-dimensional joysticks. The opening area may be expressed as an area and/or as a longitudinal displacement of the valve spool along an axis and/or as a position of a stepping motor. The predetermined relation dependent on the user input data may be implemented as a function or table stored as a data structure in the memory 215. The predetermined function may be based on a desired actuator position and/or positions indicated by the user data and provide one or more opening area values within a range, e.g. to provide A1 within the range $[A1_{min}\text{-}A1_{max}]$. Examples of predetermined relations are further described in relation to FIG. 5.

The hydraulic valve control unit 200 is further configured to determine an opening area value of the shunt valve 130 using the predetermined relation dependent on the user input data. The hydraulic valve control unit 200 is further configured to simultaneously or in close succession determine a second opening area value of the activator valve 141 using the predetermined relation.

In one example, a relative desired position of "forward" is given by moving a joystick half way forward from a resting or idle position, thereby indicating a desired position of 50%. A first opening area value can then, in one example, be determined using the predetermined relation $A1=A1_{min}+(A1_{max}-A1_{min})\times 50\%$, i.e. opening the actuator valve to half open if $A1_{min}=0$ (fully closed). An opening area value $AS_{max}$ of the shunt valve 130 is also determined using the predetermined relation $AS=AS_{min}-(AS_{max}-AS_{min})\times 50\%$, i.e. indicating opening the shunt valve to valve to half open.

As the shunt valve 130 leads hydraulic fluid from the output port of the pump 121 to the tank 123, it will be controlled by the valve control unit 200 to the maximum opening area $AS_{max}$ when the open center hydraulic system 100 is in an idle state, i.e. no pressure or fluid flow is provided to the actuator valves. When the open center hydraulic system 100 is in a fully active state, the shunt valve 130 will be controlled by the valve control unit 200 to the minimum opening area $AS_{min}$, thus assuring that the maximum controllable fluid pressure or fluid flow is provided to the actuator valves.

The hydraulic valve control unit 200 is further configured to send a first control signal S2_AS to the shunt valve 130 and send a second control signal S2_A1 to the actuator valve 141. The control signal S2_AS may be indicative of the first opening area value AS. The control signal S2_A1 may be indicative of the second opening area value.

The control signals S2_AS, S2_A1 may be indicative of one or more opening areas, and/or a longitudinal displacement of the valve spool or a position of a servo motor, such as a stepping motor, in the valve servo unit.

Figure 3A:
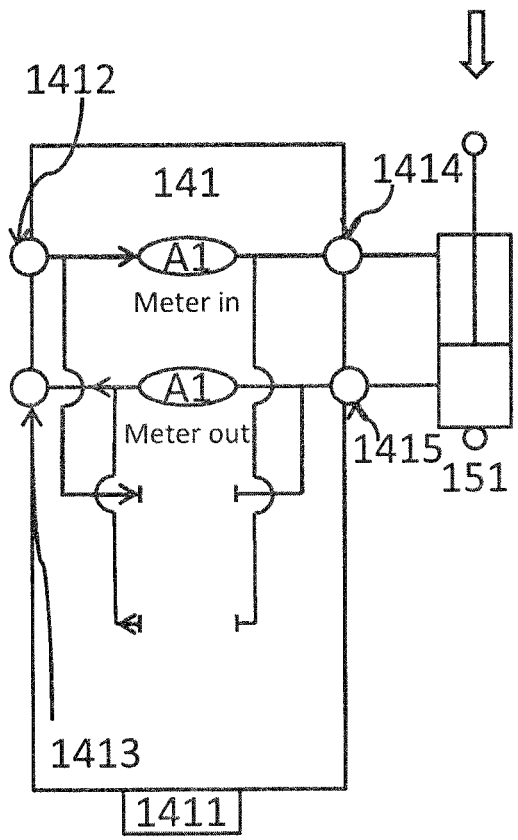
FIG. 3A-C are schematic diagrams of an actuator valve and a shunt valve being controlled according to one or more embodiments of the invention.

FIG. 3A shows an actuator valve 141, 142 controlled to move the corresponding actuator 151, 152 in a first direction. The actuator valve may comprise a pump port 1412, 1422 and a first actuator output port 1414, 1424. The actuator valve may further comprise a second actuator output port 1415, 1425 and a tank port 1413, 1423. The actuator valve may further comprise a valve spool (not shown in the figure). The valve spool is configured adjust or adapt an opening area A1, A2 between the pump port 1412, 1422 and the first actuator port 1414, 1424 and between the second actuator port 1415, 1425 and the tank port 1413, 1423 when positioned within a first position range along the longitudinal axis. The actuator valve may further comprise a valve servo unit 1411, 1412 configured to adapt or adjust the opening area A1, A2, e.g. by moving the valve spool as further described above.

Figure 3B:
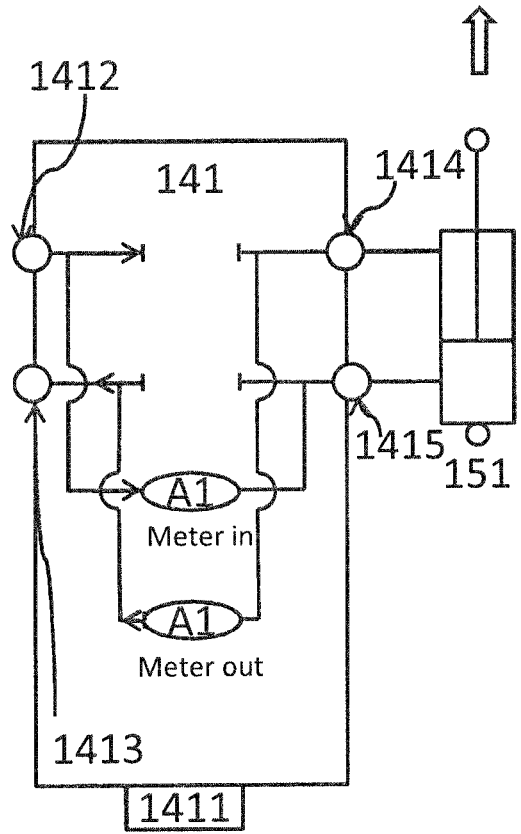

FIG. 3B shows an actuator valve controlled to move the corresponding actuator 151, 152 in a direction opposite to the first direction. The valve spool is configured to adjust or adapt an opening area A1, A2 between the pump port 1412, 1422 and the second actuator port 1415, 1425 and between the first actuator port 1414, 1424 and the tank port 1413, 1423 when positioned within a second position range along the longitudinal axis.

The first actuator port 1414, 1424 and the second actuator port 1415, 1425 can typically be used to connect to corresponding hydraulic actuator 151, 152 in a meter-in configuration and/or meter-out configuration. The actuator valves may be connected to the actuator in any suitable configuration of meter in configuration and/or meter out configuration.

Figure 3C:
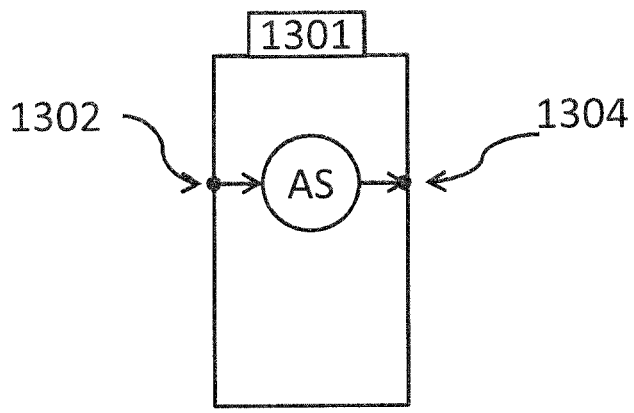

FIG. 3C shows a shunt valve 130 controlled to regulate the fluid flow from the pump 121 to the one or more actuator valves 141-143. The pump port or input port 1302 of the shunt valve 130 is coupled to the output port of the pump 121 and to each of the one or more actuator valves 141-143. The tank port or output port 1304 of the shunt valve 130 is coupled to the tank 123. The shunt valve 130 may further comprise a valve spool (not shown in the figure). The valve spool of the shunt valve 130 is configured adjust or adapt an opening area AS between the pump port 1302 of the shunt valve 130 and the tank port 1304 of the shunt valve 130. The shunt valve 130 may further comprise a valve servo unit 1301 configured to adapt or adjust the opening area AS, e.g. by moving the valve spool as further described above.

Figure 4:
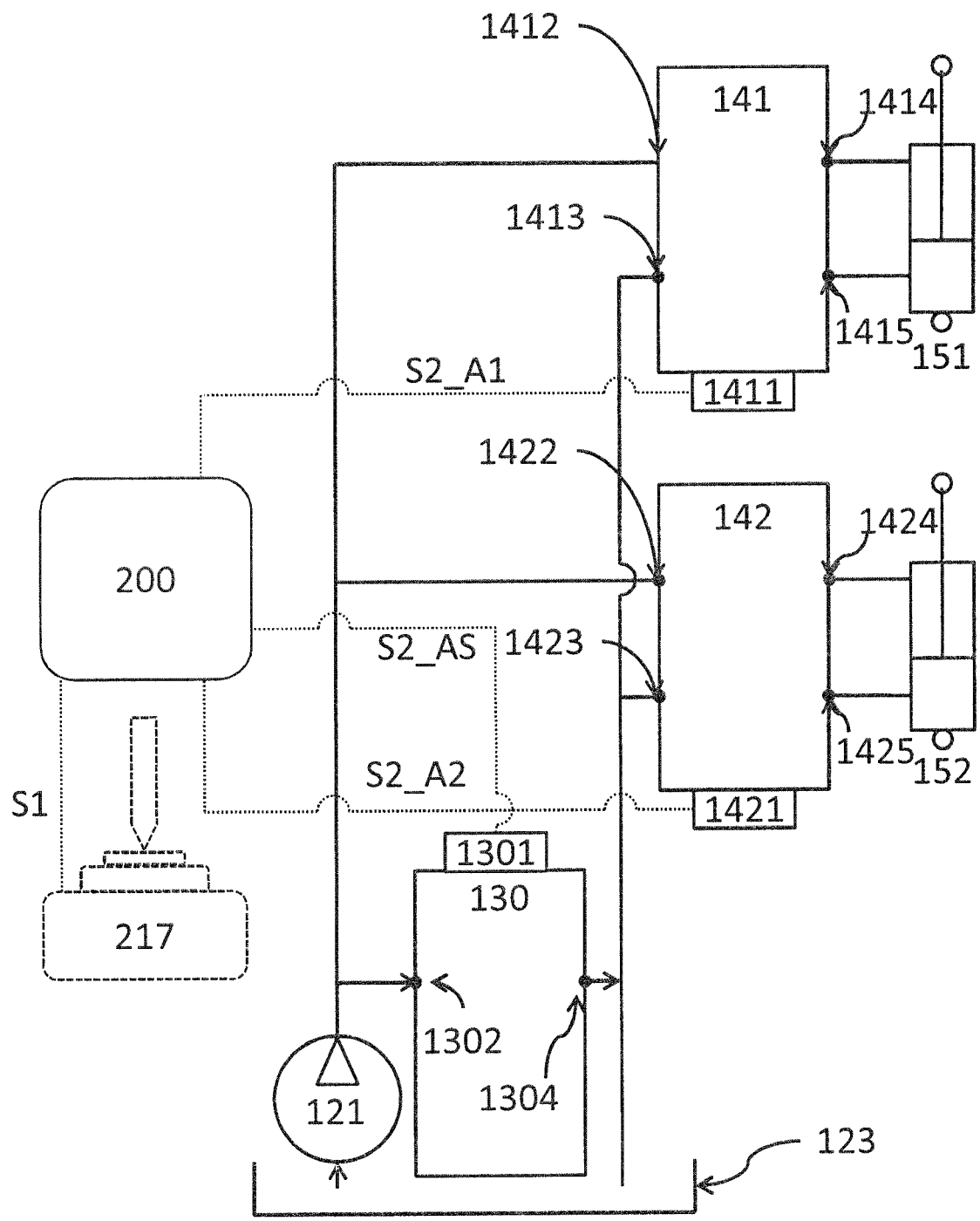
FIG. 4 is a schematic diagram of an example of how the shunt valve and the one or more actuator valves are controlled based on control signals according to one or more embodiments of the invention.

FIG. 4 illustrates an example of how the shunt valve 130 and the one or more actuator valves 141-143 are controlled based on control signals, e.g. comprising or being indicative of the determined open area values AS, A1, A2. A control signal S1 is sent from the input device 217, depicted in FIG. 4 as a joystick, and comprising user data indicative of one or more desired actuator's positions. The hydraulic valve control unit 200 determines an opening area value AS of the shunt valve 130, an opening area value A1 of the first actuator valve 141 and optionally an opening area value A2 of the second actuator valve 142 based on the one or more desired actuator's positions. A control signal S2_AS indicative of the opening area value AS of the shunt valve is sent to the valve servo unit 1301 comprised in the shunt valve 130. A control signal S2_A1 indicative of the opening area value A1 of the first actuator valve 141 is sent to the valve servo unit 1411 comprised in the first actuator valve 141. Optionally, a control signal S2_A2 indicative of the opening area value A2 of the second actuator valve 142 is sent to the valve servo unit 1421 comprised in the second actuator valve 142. The valve servo unit 1301 comprised in the shunt valve 130 controls the shunt valve, e.g. the valve spool of the shunt valve, to provide an opening area of the shunt valve AS, as indicated by the control signal S2_AS. The valve servo unit 1411 comprised in the first actuator valve 141 controls the first actuator valve 141, e.g. the valve spool of the first actuator valve 141, to provide an opening area A1 of the first actuator valve 141 as indicated by the control signal S2_A1. Optionally, the valve servo unit 1421 comprised in the second actuator valve 142 controls the second actuator valve 142, e.g. the valve spool of the second actuator valve 142, to provide an opening area A2 of the second actuator valve 142 as indicated by the control signal S2_A2. It is understood that the actuator valves may alternatively be coupled to the respective actuator in meter in and/or meter out configuration without deviating from the invention.

In one example, the control circuitry of the valve servo unit 1301 comprised in the shunt valve 130 receives the control signal S2_AS from the hydraulic valve control unit 200 indicative of the opening area AS of the shunt valve 130 and controls the valve spool via the electric valve actuator, e.g. a stepping motor, to provide the opening area AS of the shunt valve 130. The control circuitry of the valve servo unit 1411-1421 comprised in one of the one or more actuator valves 141-143 receives the control signal S2_A1, S2_A2 from the hydraulic valve control unit 200 indicative of the opening area A1, A2 of the actuator valve and controls the valve spool via the electric valve actuator, e.g. a stepping motor, to provide the opening area A1-A2 of the actuator valve 141-143.

Figure 5:
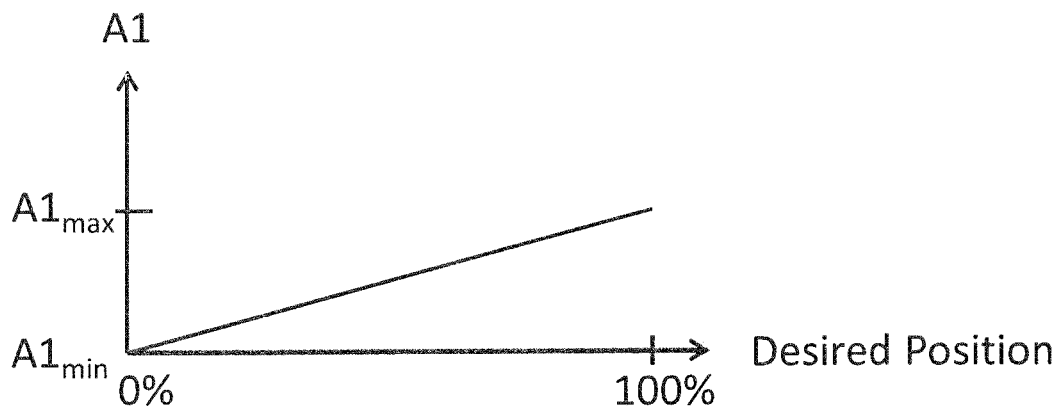
FIG. 5 are graphs illustrating a predetermined relation according to one or more embodiments of the invention.
Figure 5:
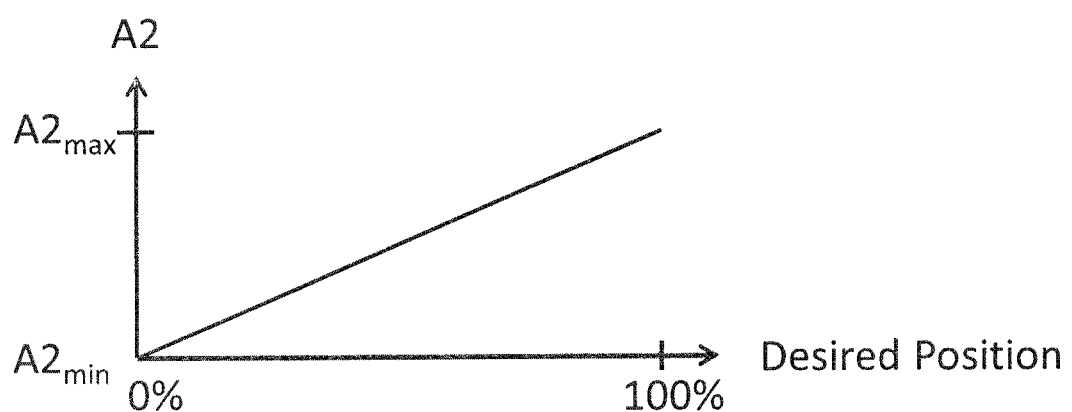
Figure 5:
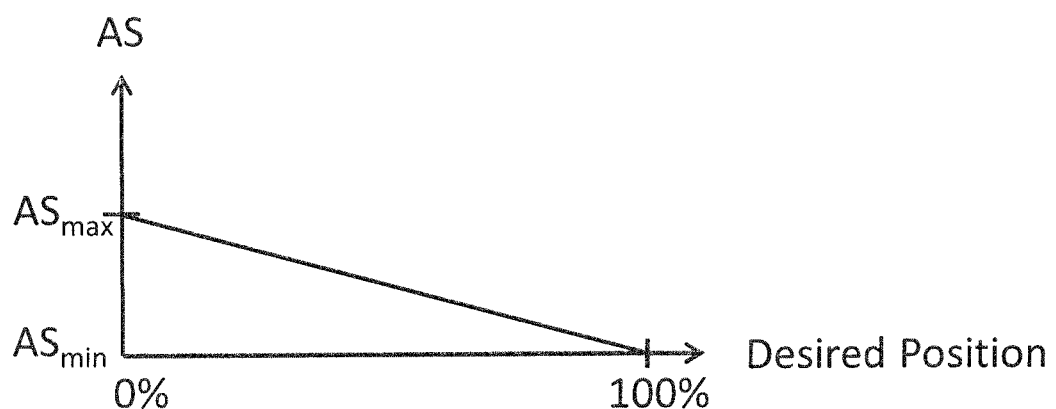

FIG. 5 illustrates a predetermined relation according to one or more embodiments of the present disclosure. FIG. 5 shows a first part of the predetermined relation as a diagram with a horizontal axis showing a desired actuator's 151-153 position as a percentage between 0% and 100%. The diagram has a vertical axis showing the corresponding determined opening area A1 of the first actuator valve 141.

FIG. 5 further illustrates a second part of the predetermined relation. FIG. 5 shows the second part of the predetermined relation as a diagram with a horizontal axis showing the desired actuator's 151-153 position as a percentage between 0% and 100%. The diagram has a vertical axis showing the corresponding determined opening area A2 of the second actuator valve 142.

FIG. 5 further illustrates a third part of the predetermined relation. FIG. 5 shows the third part of the predetermined relation as a diagram with a horizontal axis showing the desired actuator's 151-153 position as a percentage between 0% and 100%. The diagram has a vertical axis showing the corresponding determined opening area AS of the shunt valve 130.

In one example, a joystick may be moved from a centered or idle position corresponding to a desired position of 0% to a position fully forward corresponding to a desired position of 100%. The opening areas $A1_{min}$, $A2_{min}$ and $AS_{min}$ may be equal to 0 $mm_2$ and the opening areas $A1_{max}$, $A2_{max}$, $AS_{max}$ may be equal to 10 $mm^2$.

The input device 217 may initially be in an idle position, corresponding to 0%. The opening area A1 of the first actuator valve 141 would then be determined to $A1=A1_{min}+(A1_{max}-A1_{min})\times 0\%=A1_{min}$. The opening area A2 of the second actuator valve 142 would then be determined to $A2=A2_{min}+(A2_{max}-A2_{min})\times 0\%=A2_{min}$. The opening area AS of the shunt valve 130 would then be determined to $AS=AS_{max}-(AS_{max}-AS_{min})\times 0\%=AS_{max}$, e.g. A1=A2=0 $mm^2$ and AS=10 $mm^2$.

The joystick may then be moved to indicate a desired position of 25%. The opening area A1 of the first actuator valve 141 would then be determined to $A1=A1_{min}+(A1_{max}-A1_{min})\times 25\%=2.5$ $mm^2$. The opening area A2 of the second actuator valve 142 would then be determined to $A2=A2_{min}+(A2_{max}-A2_{min})\times 25\%=2.5$ $mm^2$. The opening area AS of the shunt valve 130 would then be determined to $AS=AS_{max}-(AS_{max}-AS_{min})\times 25\%=7.5$ $mm^2$.

Any suitable relation from one or more desired actuator's 151-153 positions to the opening area AS of the shunt valve 130 and the opening area A1 of the first actuator 141 and the opening area A2 of the second actuator 142 may be considered.

The one or more desired actuator's 151-153 positions comprised in the user input data is for the sake of clarity in the figure shown as one-dimensional, 0%-100%. It is understood that the input data may indicate multiple desired actuator's 151-153 positions simultaneously, e.g. by moving a multi-dimensional joystick or by moving multiple joysticks, where the predetermined relation may be extended to each of these dimensions.

In an embodiment of the open center hydraulic system 100, further described in relation to FIG. 1, the open center hydraulic system 100 comprises the tank 123 configured to hold hydraulic fluid and the pump 121 configured to provide pressurized hydraulic fluid from the tank 123. The hydraulic system 100 further comprises the shunt valve 130 configured to adapt an first opening area AS between the first input port 1302 and the first output port 1304 of the shunt valve 130 dependent on the first control signal S2_AS, as further described in relation to FIG. 4. The first input port 1302 is coupled to the pump 121, and the first output port 1304 is coupled to the tank 123. The hydraulic system 100 further comprises the first actuator valve 141 coupled to the first input port 1302 and configured to adapt the second opening area A1 of the first actuator valve dependent on the control signal S2_A1. The hydraulic system 100 further comprises the hydraulic valve control unit 200 configured to determine the first opening area value, indicative of AS, and/or the second opening area value, indicative of A1, and/or the third opening area value, indicative of A2 based on the user input data and the predetermined relation dependent on the user input data. The hydraulic valve control unit 200 is further configured to send the first control signal S2_AS, indicative of the first opening area value and/or send the second control signal S2_A1 indicative of the second opening area value and/or send the third control signal S2_A2 indicative of the third opening area value. As described in relation to FIG. 4, the first control signal S2_AS is sent to the shunt valve 130 and the second control signal S2_A1 is sent to the first actuator valve 141. Optionally the third control signal S2_A2 is sent to the second actuator valve 142.

If valves of all hydraulic functions are centralized at one point, e.g. at the cabin of a vehicle. A disadvantage is than that a large amount of hydraulic hoses are required to connect each hydraulic function to a respective valve, even though the hydraulic actuators of the hydraulic functions may be arranged next to each other. E.g. tilt and third function of a front loader.

Figure 6A:
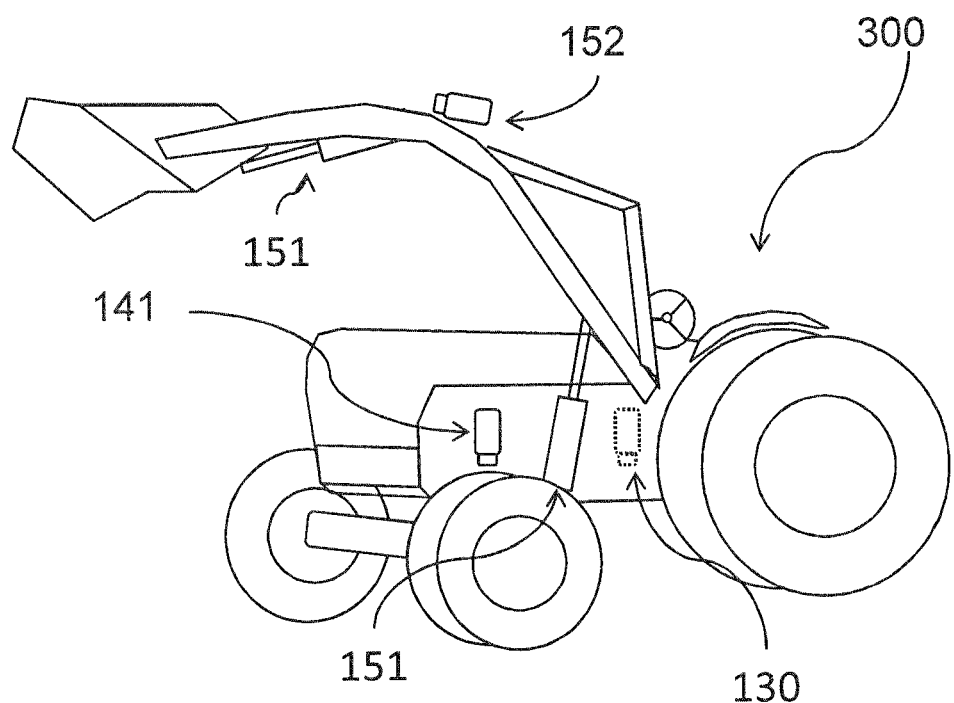
FIG. 6A is a perspective view of the open center hydraulic system having a shunt valve and a second actuator valve arranged separately relative to each other according to an embodiment of the invention.

FIG. 6A shows how the shunt valve 130 and the first actuator valve 141 are arranged separately according to one or more embodiments of the invention. The open center hydraulic system 100 may configured to be mounted on a vehicle 300. The shunt valve 130 and the first actuator valve 141, coupled to the first actuator 151, are arranged separately relative to each other. In the example in FIG. 6A, the shunt valve 130 is arranged at the back of the vehicle and the first actuator valve 141 is arranged at the front of the vehicle. FIG. 6A also shows how the second actuator valve 142, coupled to the second actuator 152, is arranged separately from the shunt valve 130 and the first actuator valve 141.

The advantage of this embodiment is at least that a more flexible design of the hydraulic system is obtained. The advantage of this embodiment is at least that the total length of hydraulic connectors used, such as hydraulic hoses, is reduced.

Figure 6B:
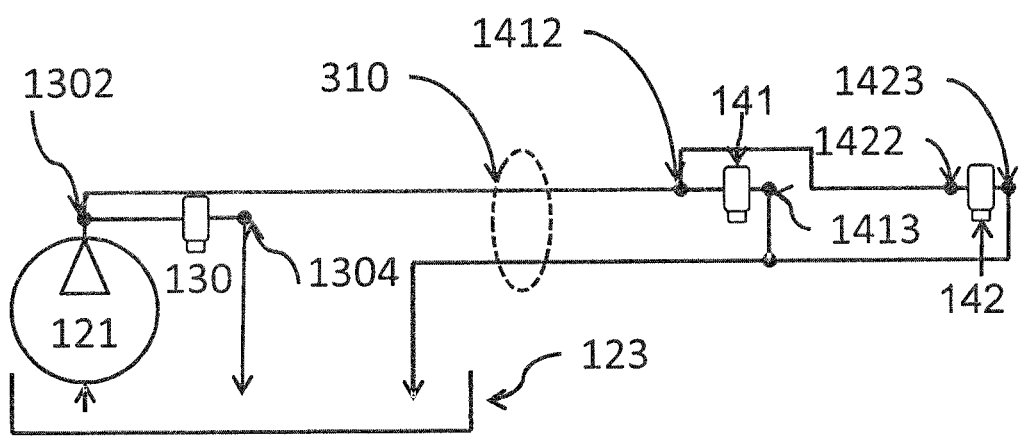
FIG. 6B is a schematic diagram showing two actuator valves using a common connection according to an embodiment of the invention.

FIG. 6B shows first and second actuator valves using a common connection 310 according to one or more embodiments of the present disclosure. The pump 121 is connected to the first input port 1302 of the shunt valve 130. In an embodiment, the first actuator valve 141 and the second actuator valve 142 are coupled to the first input port 1302 using a common connection 310.

The advantage of this embodiment is at least that the total length of hydraulic connectors used, such as hydraulic hoses, is further reduced by using a common connection 310, rather than dedicated connections for each hydraulic actuator. A further advantage is that a removable hydraulic tool, such as a front loader, can be disconnected with a single pair of connectors. A further advantage is that the connectors are more easily connected/disconnected as they are connected without hydraulic fluid pressure. This is achieved as the shunt valve in an idle state is normally fully open to the tank, thus providing no or very little fluid pressure to the actuators.

Uncontrolled cylinder movement in the event of a pipe rupture or hose break is normally prevented by introducing line rupture protection valves, check valves or burst pipe protection valves. This has the drawback of adding additional complexity and cost to the hydraulic system. The invention solves this by mounting the actuator valve to the actuator.

Figure 7A:
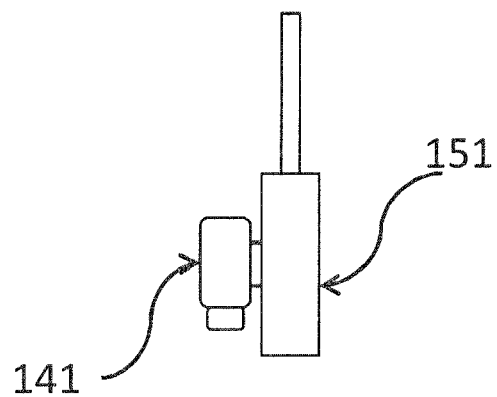
FIG. 7A is a side view of an actuator valve being attached to and coupled to a hydraulic actuator according to one or more embodiments of the invention.

FIG. 7A shows an actuator valve being attached to and coupled to a hydraulic actuator according to one or more embodiments of the invention. FIG. 7A shows how the first actuator valve 141 is attached to and coupled to the first hydraulic actuator 151. The actuator valve may be bolted or welded onto the actuator. The actuator valve may be coupled to the actuator using fixed connectors or pipes.

At least one advantage of this embodiment is that complexity and cost of the hydraulic system is reduced. A further advantage is that uncontrolled cylinder movement in the event of a pipe rupture or hose break is prevented.

Figure 7B:
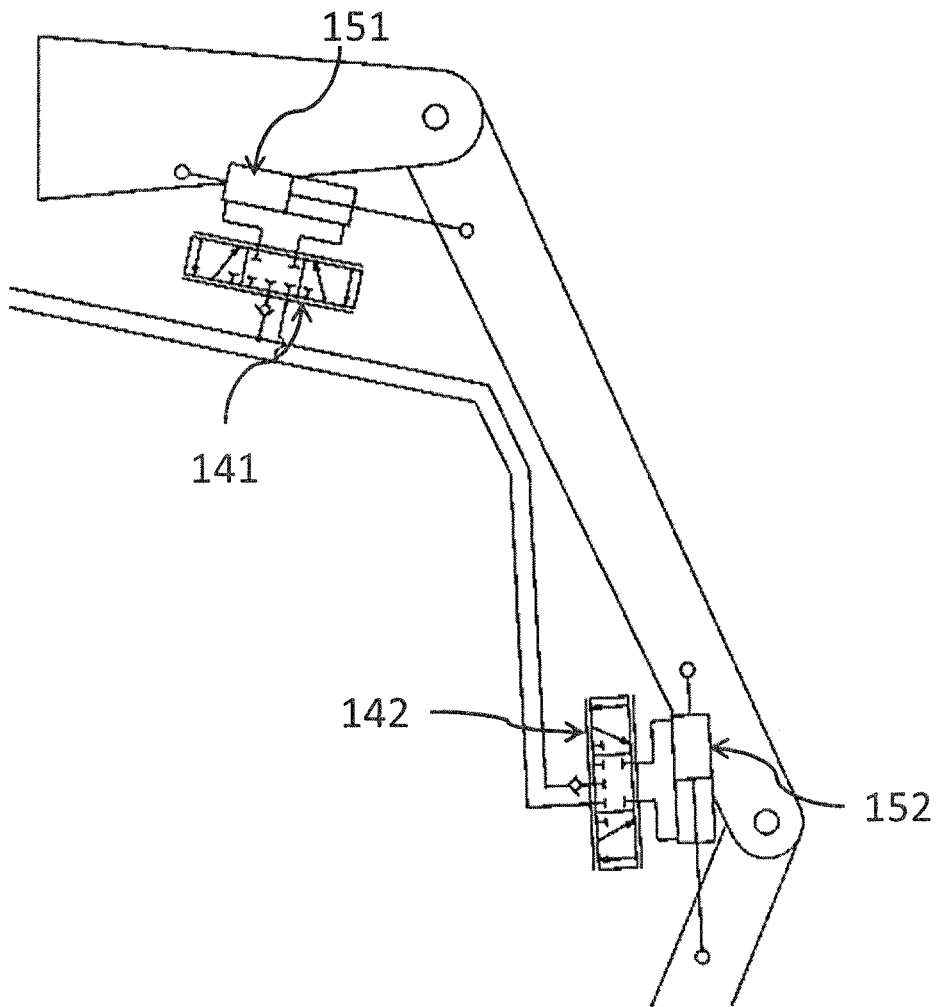
FIG. 7B is a hydraulic schematic diagram of the actuator valve being attached to and coupled to the hydraulic actuator according to one or more embodiments of the invention.

FIG. 7B shows hydraulic schematics of the actuator valves 141, 142 being attached to and coupled to corresponding hydraulic actuators 151, 152 according to one or more embodiments of the invention. The symbols indicative of the first and second actuator values show three controllable positions of the actuator valves. In the first position the actuator valve 141, 142 is controlled to move the corresponding double action actuator 151, 152 in a first direction. In the second position, the actuator valve 141, 142 is controlled to hold the corresponding actuator 151, 152 in a position. In the third position the actuator valve 141, 142 is controlled to move the corresponding actuator 151, 152 in a direction opposite to the first direction.

It may in some circumstances be beneficial to operate a hydraulic actuator as a single action actuator. For example, when the actuator is driven by other forces, such as gravity, and there is no need to share the hydraulic fluid flow from the pump with other hydraulic functions, e.g., when letting the gravitational force and not the pressurized hydraulic fluid bring the load carried by a front loader lifting arm down.

Figure 8:
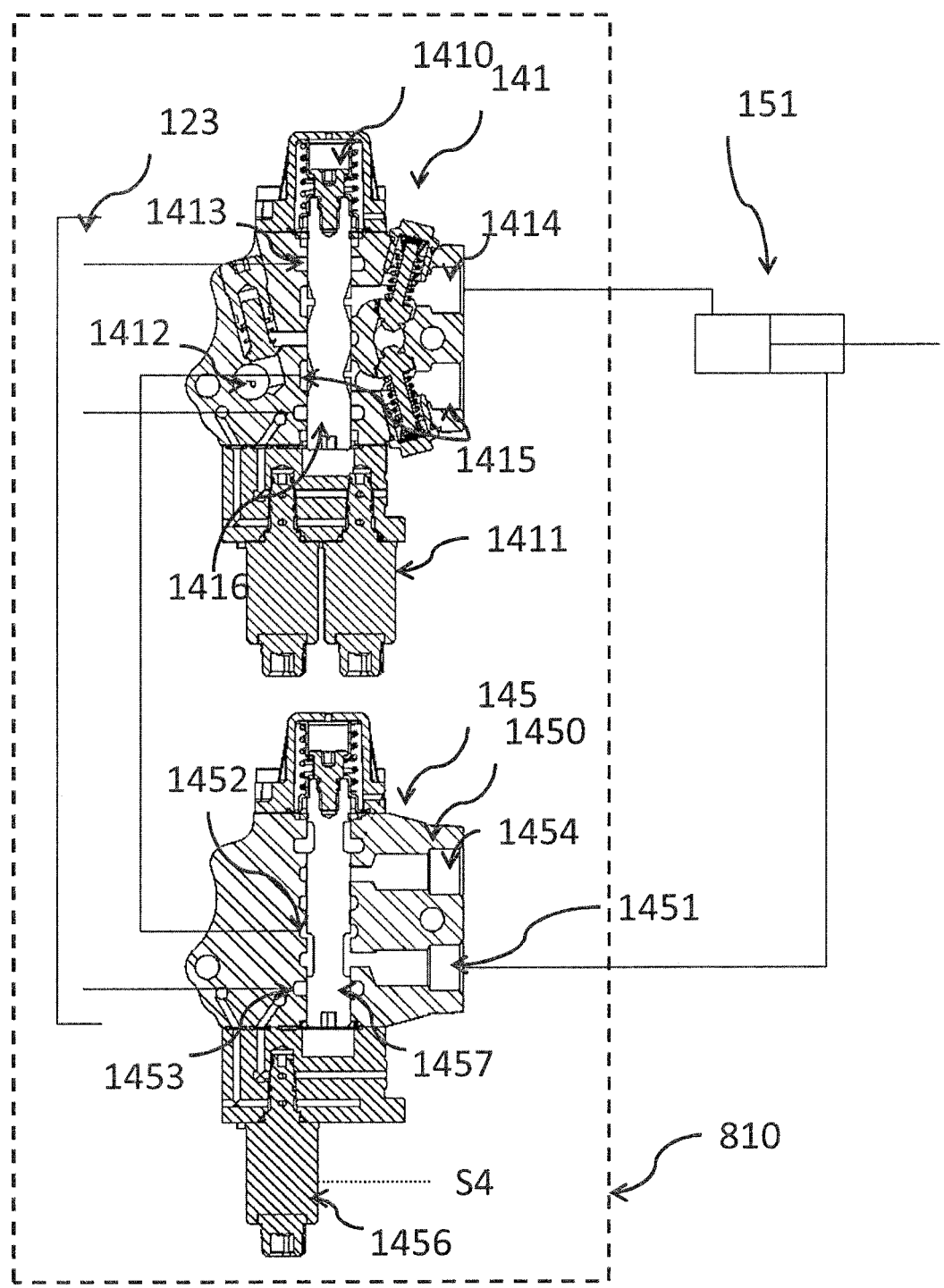
FIG. 8 is a side view in section schematically showing a function valve and the actuator valve being arranged together as an integrated valve unit according to one or more embodiments of the invention.

FIG. 8 shows the hydraulic system 100 comprising a function valve 145 according to one or more embodiments of the invention. The function valve 145 comprises a first function port 1451 coupled to a corresponding first hydraulic actuator 151. It is appreciated that first function port 1451 can be coupled to either side or port of the hydraulic actuator, e.g. a hydraulic cylinder. The function valve 145 further comprises a second function port 1452 coupled to a second actuator port 1415 of the first actuator valve 141 and a third function port 1453 coupled to the tank 123. The function valve 145 is configured to direct fluid received at the first function port 1451 to the second function port 1452 or to the third function port 1453 of the function valve 145 dependent on the control signal S4.

The control signal S4 may be indicative of one or more opening areas, and/or a longitudinal displacement of the valve spool or a position of a servo motor, such as a stepping motor, in the valve servo unit 1456.

Depending on the application of the hydraulic system, e.g. in a vehicle, the actual configuration of shunt valve, actuator valves and function valves may vary. The present disclosure solves this by shaping, designing or forming the valves as valve sections 1410, 1450. The valve sections may then be assembled or integrated as an integrated valve servo unit. The valve servo unit may further be formed with internal connections for hydraulic fluid designed to connect adjacent valve sections and/or ports of the valve sections. This arrangement eliminates the need for dedicated connectors, such as hydraulic hoses.

In one or more embodiments, the function valve 145 is formed as a first valve section 1450 and the first actuator valve 141 is formed as a second valve section 1410. In one embodiment, the first valve section 1450, and the second valve section 1410 are mounted or arranged together as an integrated valve unit 810.

Figure 9A:
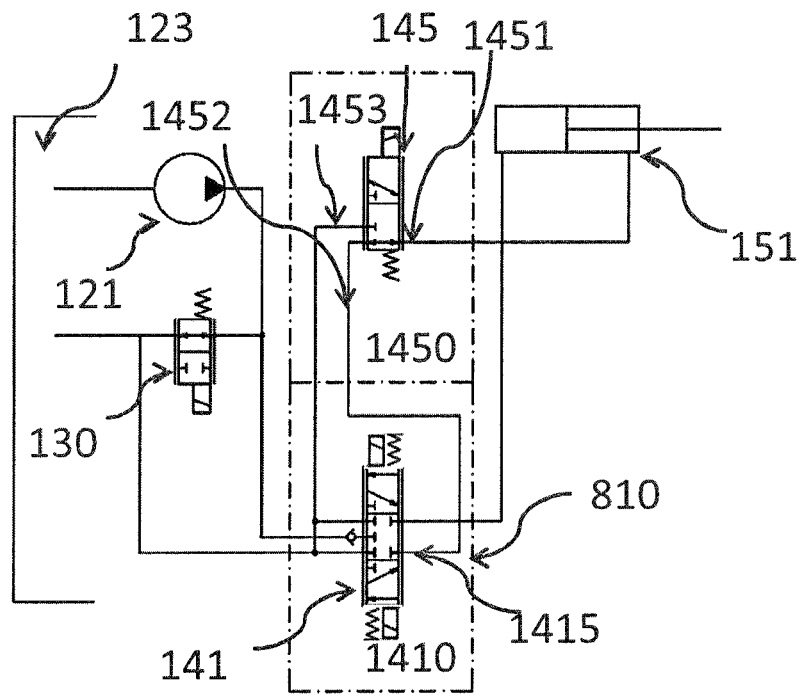
FIGS. 9A and 9B are schematic diagrams showing a function valve, a function valve and an actuator valve being arranged together as an integrated valve unit according to an embodiment of the invention.

FIG. 9A shows an example of an actuator operated as a double action actuator according to one or more embodiments of the invention. The figure shows how the hydraulic fluid pump 121 is coupled to the shunt valve 130, the actuator valve 141 and the hydraulic fluid tank 123. The function valve 145 is coupled to the tank and to the actuator valve 141. The actuator valve port 1452 is coupled to the second actuator port 1415 of the actuator valve 141. The tank port 1453 is coupled to the tank 123. The first actuator port 1451 is coupled to the actuator 151.

The figure also shows how the function valve 145 may be formed as a first valve section 1450 and the first actuator valve 141 is formed as a second valve section 1410. The first valve section 1450 and the second valve section 1410 are arranged together as an integrated valve unit 810.

In the example in FIG. 9A, a user may indicate that it is suitable to operate the actuator as a double action actuator, e.g. by pressing or depressing a button. The hydraulic valve control unit 200 then generates and sends the control signal S4 to the function valve 145, which then directs fluid received at the first function port 1451 to the second function port 1452. This operation is typically performed by moving the valve spool to a first position, which could be an idle or default position.

Figure 9B:
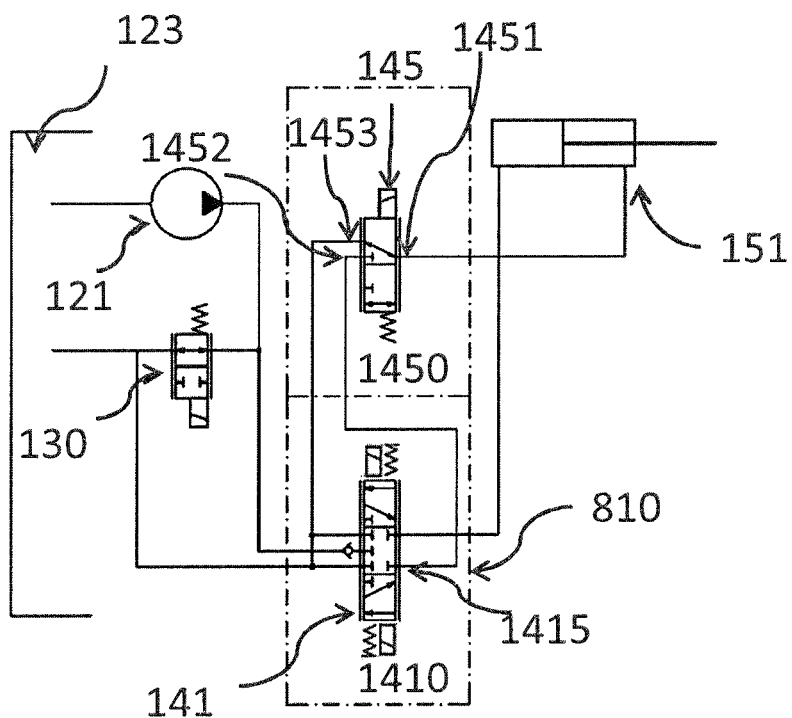

FIG. 9B shows an example of an actuator operated as a single action actuator according to one or more embodiments of the invention.

In one further example, a user may indicate that it is suitable to operate the actuator as a single action actuator, e.g. by pressing or depressing a button. The hydraulic valve control unit 200 then generates and sends the control signal S4 to the function valve 145, which then directs fluid received at the first function port 1451 to the third function port 1453 or vice versa. This operation is typically performed by moving the valve spool to a second position. Thereby one side of the actuator 151 is connected to the tank 123.

The hydraulic valve control unit 200 may in one embodiment further generate and send the control signal S2_AS to the shunt valve 130, thereby controlling it to be fully open and providing no fluid flow to the actuator valves.

At least one advantage of this embodiment is that waste of hydraulic fluid flow when not needed to operate the actuator is reduced and can be used for other hydraulic functions.

Figure 10:
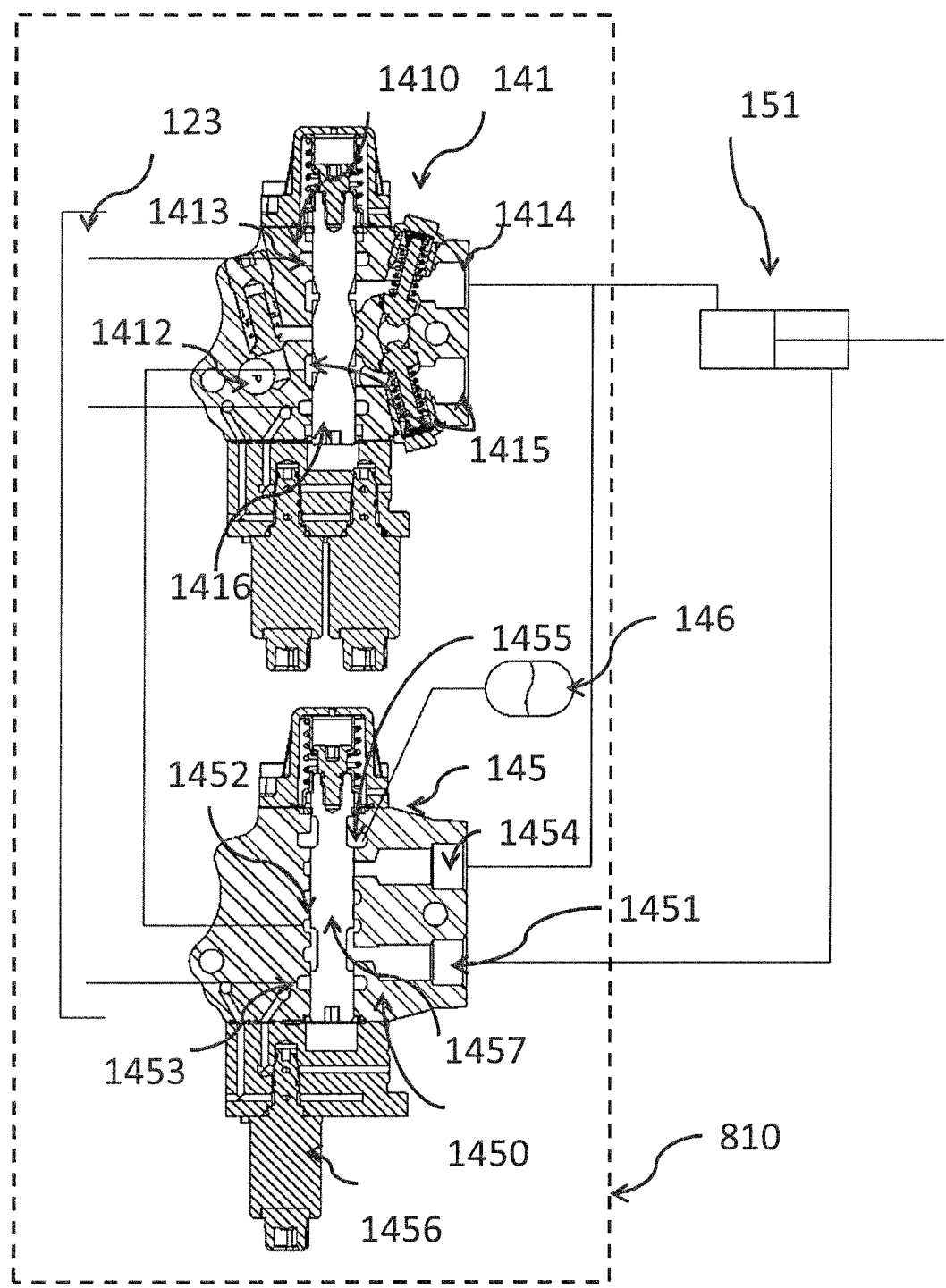
FIG. 10 is a side view in section of a hydraulic system that is not part of the invention.

FIG. 10 shows the hydraulic system 100 comprising the function valve 145 with a load dampening accumulator 146 according to one or more embodiments of the invention. The function valve 145 further comprises a fourth function port 1454 coupled to the first actuator port 1414 of the first actuator valve 141 and a fifth function port 1455 fixed or removable coupled to an dampening accumulator 146. The function valve 145 is in this embodiment further configured to direct fluid between the fourth function port 1454 of the function valve 145 and the fifth function port 1455 of the function valve 145 or to block fluid received at the at the fourth function port 1454 dependent on the control signal S4. The control signal S4 is typically received by the valve servo unit 1456 which in turn move the valve spool 1457 along the longitudinal axis to activate the functions of the function valve 145 described in relation to FIG. 8 and FIG. 10 independently or simultaneously, as further described below in relation to detailed embodiments of the actuator valve.

Figure 11:
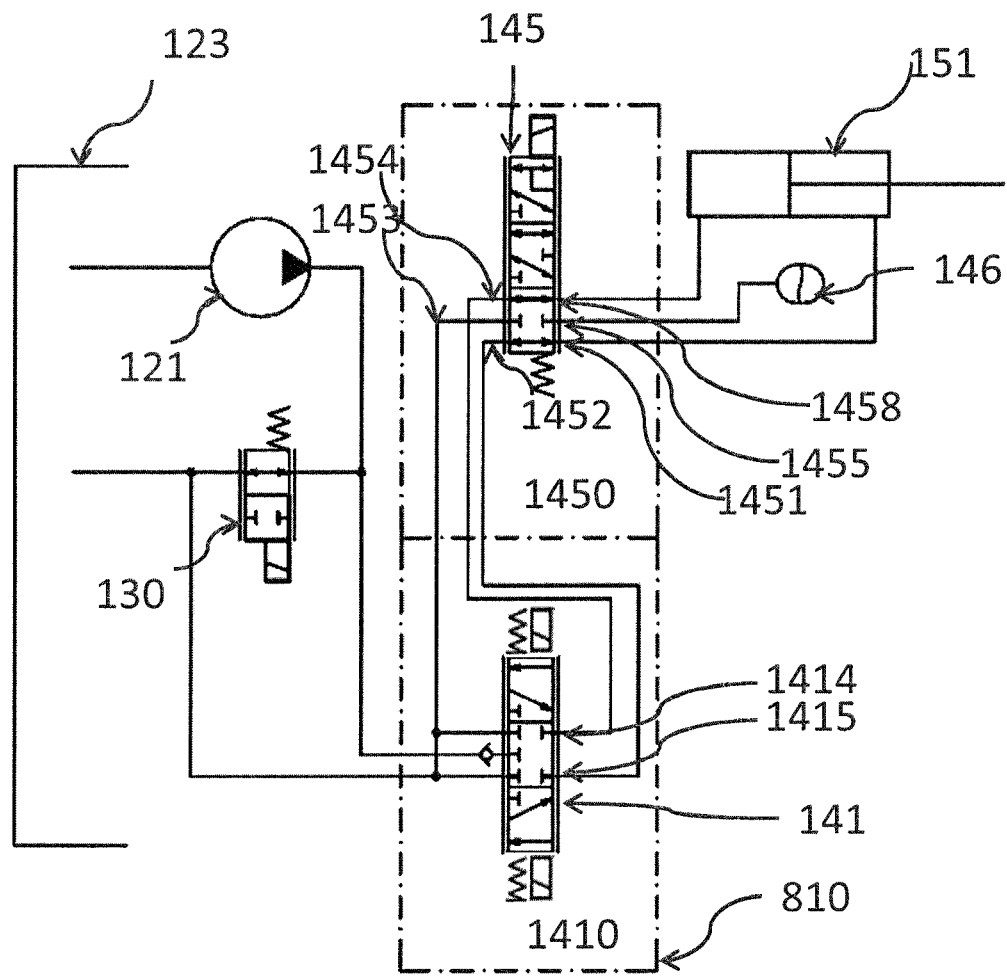
FIGS. 11-13 are schematic diagrams of a hydraulic system according to embodiments of the invention.

FIG. 11 shows an example of an actuator operated as a double action actuator according to one or more embodiments of the invention.

In the example in FIG. 11, a user indicates that it is suitable to operate the actuator as a double action actuator, e.g. by pressing or depressing a button. The hydraulic valve control unit 200 then generates and sends the control signal S4 to the function valve 145, which then directs fluid received at the first function port 1451 to the second function port 1452. The function valve 145 further directs fluid received at the fourth function port 1454 to the sixth function port 1458 or vice versa.

This operation is typically performed by moving the valve spool to a first position, which could be an idle or default position.

In other words, hydraulic fluid flowing from the pump 121 will flow via the actuator valve 141 to the actuator 151 and return from the actuator 151 via the actuator valve 141 to the tank 123.

Figure 12:
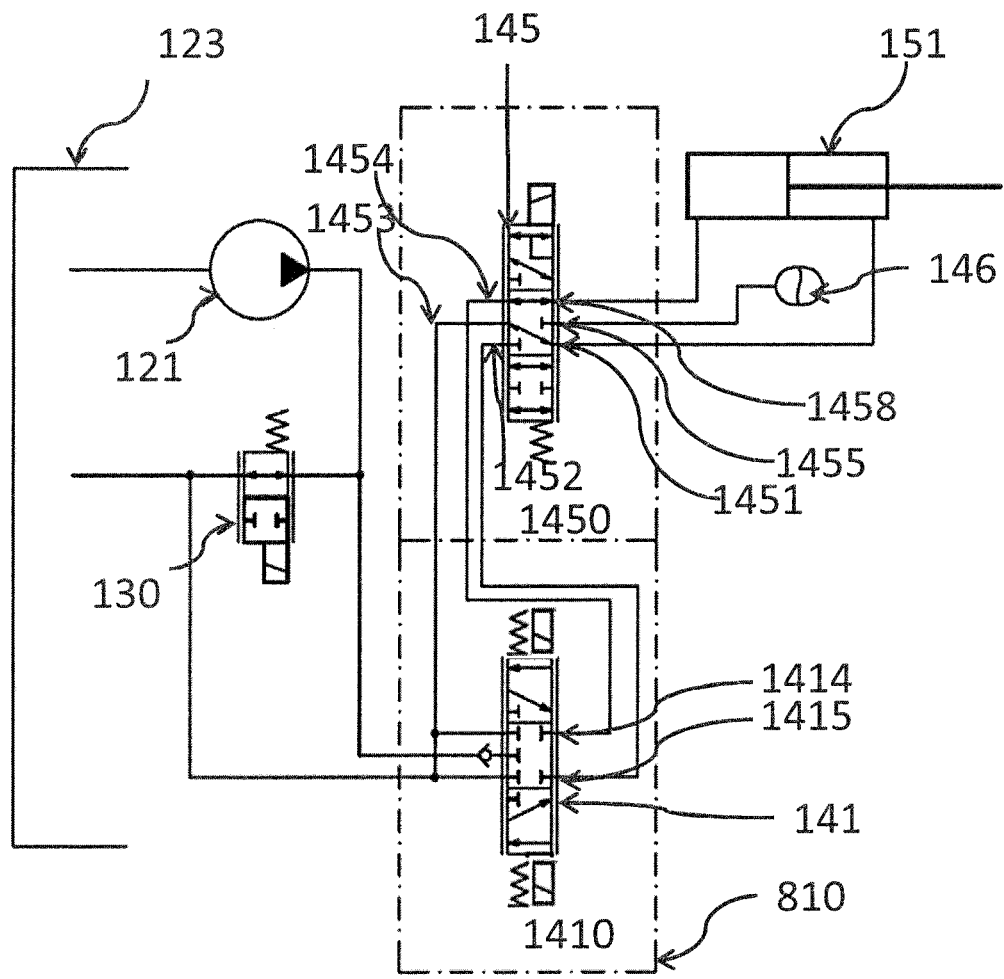

FIG. 12 shows an example of an actuator operated as a single action actuator according to one or more embodiments of the invention.

In the example in FIG. 12, a user indicates that it is suitable to operate the actuator as a single action actuator, e.g. by pressing or depressing a button. The hydraulic valve control unit 200 then generates and sends the control signal S4 to the function valve 145, which then directs fluid received at the first function port 1451 to the third function port 1453. The function valve 145 further directs fluid received at the fourth function port 1454 to the sixth function port 1458 or vice versa.

This operation is typically performed by moving the valve spool to a second position. In other words, hydraulic fluid flowing from the pump 121 will flow via the actuator valve 141 to the actuator 151 and return from the actuator 151 via the function valve 145 to the tank 123.

Figure 13:
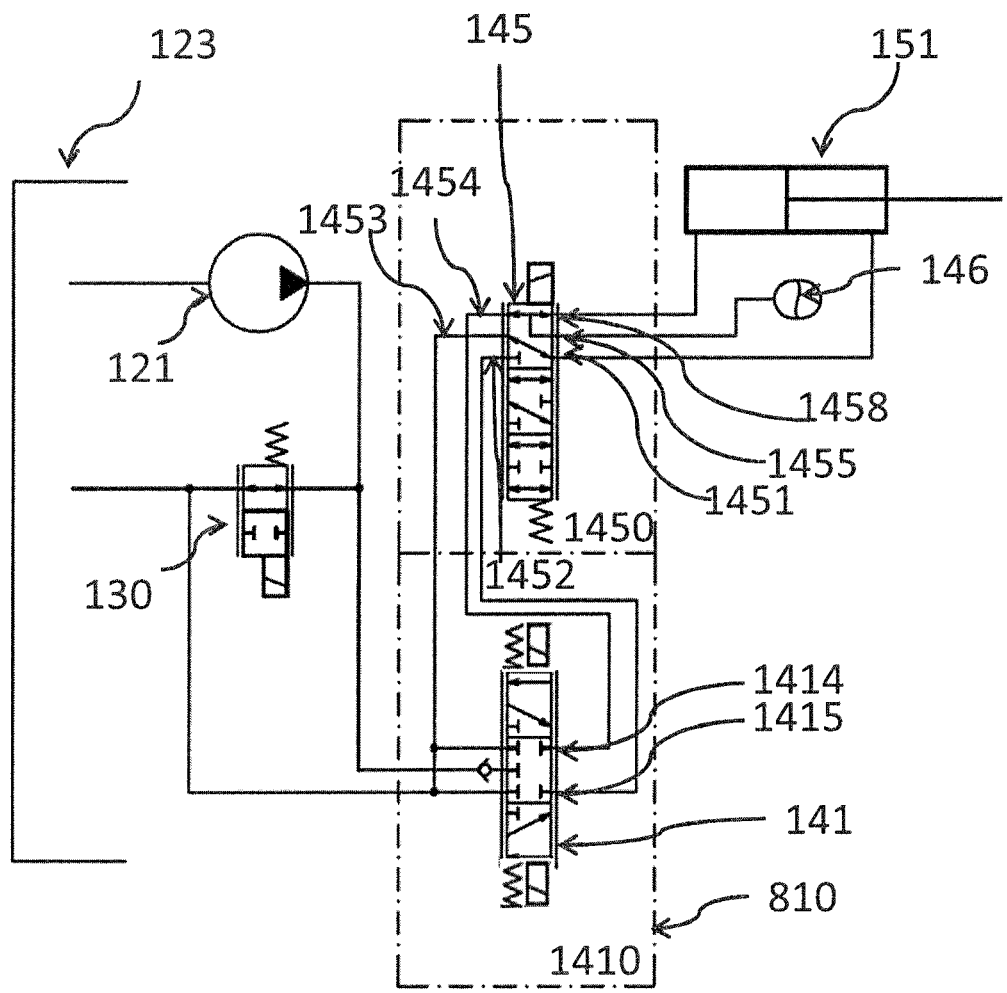

FIG. 13 shows an example of an actuator operated as a single action actuator with load dampening functionality according to one or more embodiments of the invention.

In the example in FIG. 13, a user indicates that it is suitable to operate the actuator as a single action actuator with load dampening functionality, e.g. by pressing or depressing a button. The hydraulic valve control unit 200 then generates and sends the control signal S4 to the function valve 145, which then directs fluid received at the first function port 1451 to the third function port 1453 and directs fluid received at the at the fourth function port 1454 of the function valve 145 to the fifth function port 1455 of the function valve 145, typically coupled to the load dampening accumulator 146. The function valve 145 further directs fluid received at the fourth function port 1454 to the sixth function port 1458 or vice versa.

This operation is typically performed by moving the valve spool to a third position. In other words, hydraulic fluid flowing from the pump 121 will flow via the actuator valve 141 and the function valve 145 to the actuator 151 and return from the actuator 151 via the function valve 145 to the tank 123. Thereby, oscillations in the fluid pressure will be dampened, e.g. when a vehicle with a front loader drives along a bumpy road.

At least one advantage is that a hydraulic actuator may be operated as a double or single action actuator with optional simultaneous load dampening functionality. A further advantage is that cost and complexity of the hydraulic system is reduced by operating multiple functions using a single function valve.

Depending on the application of the hydraulic system in a vehicle, the actual configuration of shunt valve, actuator valves and function valves may vary. The present disclosure solves this by shaping, designing or forming the valves as valve sections. The valve sections may then be assembled or integrated as an integrated valve unit. The valve unit may further be formed with internal connections for hydraulic fluid designed to connect adjacent valve sections. This arrangement eliminates the need for dedicated connectors, such as hydraulic hoses.

In one or more embodiments, the function valve 145 is formed as a first valve section 1450, and the first actuator valve 141 is formed as a second valve section 1410. In one embodiment, the first valve section 1450 and the second valve section 1410 are arranged together as an integrated valve unit 810.

As some hydraulic functions may be used more seldom or requiring less flow of hydraulic fluid, the present disclosure provides actuator valves having different maximum adaptable size of the opening area.

In one or more embodiments, the system further comprises a second actuator valve 142 coupled to the first input port 1302 and configured to adapt a third opening area A2 of the second actuator valve dependent on a third control signal S2_A2. The maximum adaptable size of the second opening area A1 is smaller than the maximum adaptable size of the third opening area A2.

At least one advantage is that waste of flow of hydraulic fluid for hydraulic functions not in need of the flow is reduced.

In one or more embodiments, an actuator valve 141 is provided. The actuator valve comprising:

a pump port 1412 configured to receive hydraulic fluid from a pump, a first actuator port 1414 configured to provide or receive hydraulic fluid, e.g. to/from one end of the actuator 141, a second actuator port 1415 configured to provide or receive hydraulic fluid, e.g. to/from an opposite end of the actuator 141, a tank port 1413 configured to provide or receive hydraulic fluid to a tank 123, a valve spool 1416 configured to adapt an opening area A1 between the pump port 1412 and the first actuator port 1414 when positioned within a first position range along a longitudinal axis or to adapt an opening area A1 between the pump port 1412 and the second actuator port 1415 when positioned within a second position range along the longitudinal axis, and a valve servo unit 1411 configured to move the valve spool along the longitudinal axis dependent on a control signal S2_A1. The valve servo unit 1411 is further configured to move the valve spool at least within the first position range and/or the second position range.

The actuator valve further comprises a housing, wherein the housing comprises channels connecting a valve spool cavity to the different ports, wherein the spool cavity is configured to allow the valve spool to move along a longitudinal axis thereby adapting the opening areas between the ports, as would be understood by a person skilled in the art of hydraulic valves.

As further described in relation to FIG. 3A-C the opening area may be adapted for control different directions of the hydraulic actuator, e.g. by moving a lever or joystick in opposite directions from an idle position, thereby moving the valve spool within a first position range along the longitudinal axis or within a second position range along the longitudinal axis.

In one or more embodiments, the actuator valve 141 is formed as a valve section 1410 configured to be arranged together with other valve sections as an integrated valve unit 810.

As mentioned above, in some situations it may be desirable to operate the hydraulic actuator in single action mode. The invention enables this operation by providing the function valve 145 providing capability to the open center hydraulic system 100 of operation in normal double action mode or in single action mode.

In one or more embodiments, a function valve 145 is provided, see e.g. FIG. 8. The function valve comprising:

a first actuator port 1451 configured to provide or receive hydraulic fluid from a hydraulic actuator 151, a second actuator port 1454 configured to provide or receive hydraulic fluid from a hydraulic actuator 151, an actuator valve port 1452 configured to provide or receive hydraulic fluid to an actuator valve 141, a tank port 1453 configured to provide or receive hydraulic fluid to/from a tank 123, a valve spool 1457 configured to direct fluid received at the first function port 1451 to the second function port 1452 or to the third function port 1453 of the function valve 145 dependent on a longitudinal position, and a valve servo unit 1456 configured to move the valve spool along the longitudinal axis dependent on a control signal S4.

The control signal S4 may be indicative of one or more opening areas, and/or a longitudinal displacement of the valve spool 1457 or a position of a servo motor, such as a stepping motor, in the valve servo unit 1456.

The function valve further comprises a housing, wherein the housing comprises channels connecting a valve spool cavity to the different ports, and wherein the spool cavity is configured to allow the valve spool 1457 to move along a longitudinal axis thereby adapting the opening areas between the ports, as would be understood by a person skilled in the art of hydraulic valves.

In one or more embodiments, the function valve 145 is formed as a valve section 1450 configured to be arranged together with other valve sections as an integrated valve unit 810.

In one embodiment, the function valve 145 is further configured to direct fluid received at the first function port 1451 to the second function port 1452 when positioned at a first position, or within a range around the first position. The valve spool 1457 may further be configured to direct fluid received at the first function port 1451 to the third function port 1453 when positioned at a second position, or in a range around the second position. This arrangement allows one side of the hydraulic actuator to remain connected to the tank, thus allowing hydraulic fluid to flow to or from that side. The opposite side of the hydraulic actuator can then be controlled by the actuator valve, e.g. allowing a front loader to be brought down by gravity instead of as being moved a result of hydraulic flow from the pump 121. This ability allows the hydraulic flow from the pump 121 to be used in other hydraulic functions.

To allow operation in double action mode, the valve spool may be designed to operate within a range around the first position. To allow operation in single action mode, the valve spool is designed to operate in a range around the second position.

In one embodiment, the function valve 145 is further configured to activate load dampening functionality when the valve spool is positioned in a third position, or within a range around the third position.

FIG. 9 shows a function valve 145 capable of operation in in single action mode with load dampening functionality according to one or more embodiments of the present disclosure.

In one embodiment, the function valve 145 further comprises a fourth function port 1454 configured to be coupled to the first actuator port 1414, and comprising a fifth function port 1455 coupled to or configured to be coupled to the dampening accumulator 146.

The valve spool 1457 may further be configured to direct fluid received at the first function port 1451 to the third function port 1453 and to direct fluid received at the at the fourth function port 1454 to the fifth function port 1455 when positioned at the third position or within a range around the third position.

At least one advantage of this embodiment is that load dampening functionality may be provided when operating in single action mode.

In one embodiment, a computer program is provided comprising computer-executable instructions for causing the hydraulic valve control unit 200 when the computer-executable instructions are executed on a processing unit comprised in the hydraulic valve control unit 200, to perform any of the methods described herein. Furthermore, any methods according to embodiments of the invention may be implemented in a computer program, having code, which when run by a processor causes the processor to execute the steps of the method. The computer program is included in a computer readable medium of a computer program product.

In one embodiment, a computer program product is provided comprising a computer-readable storage medium, the computer-readable storage medium having the computer program above embodied therein. The memory and/or computer-readable storage medium referred to herein may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

In one embodiment, a carrier contains the computer program above, wherein the carrier is one of an electronic signal, optical signal, radio signal, or computer readable storage medium.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the hydraulic valve control unit 200 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, encoder, decoder, power supply units, power feeders, communication interfaces, communication protocols, etc. which are suitably arranged together for performing the present solution.

Especially, the processor and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processor" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as call processing control, user interface control, or the like.

While various embodiments have been chosen to illustrate the invention, it will be understood by those skilled in the art that various changes and modifications can be made therein without departing from the scope of the invention as defined in the claims.

The invention claimed is:

1. An open center hydraulic system, comprising:
   a tank configured to hold hydraulic fluid;
   a pump configured to provide pressurized hydraulic fluid from the tank;
   a shunt valve configured to adapt an first opening area between a first input port and a first output port of the shunt valve dependent on a first control signal, the first input port being coupled to the pump and the first output port being coupled to the tank, a first actuator valve coupled to the first input port and configured to adapt a second opening area of the first actuator valve dependent on a second control signal, the first actuator valve being attached to and coupled to a first hydraulic actuator;

a function valve including a first function port coupled to the first hydraulic actuator, a second function port coupled to a second actuator port of the first actuator valve, a third function port coupled to the tank, a fourth function port coupled to the first actuator port of the first actuator valve and a fifth function port coupled to an dampening accumulator, the function valve being configured to direct fluid received at the first function port to the second function port or to the third function port of the function valve dependent on a fourth control signal and being configured to direct fluid received at the at the fourth function port of the function valve to the fifth function port of the function valve or to block fluid received at the at the fourth function port dependent on the fourth control signal; and a hydraulic valve control unit configured to
determine the first opening area value and the second opening area value based on user input data and a predetermined relation dependent on the user input data, and sending the first control signal, indicative of the first opening area value, sending the second control signal indicative of the second opening area value and the fourth control signal.

2. The open center hydraulic system according to claim 1, wherein the shunt valve and the first actuator valve are arranged separately relative to each other.

3. The open center hydraulic system according to claim 2, wherein the open center hydraulic system is mounted on a vehicle.

4. The open center hydraulic system according to claim 1, wherein the first actuator valve and a second actuator valve are coupled to the first input port using a common connection.

5. The hydraulic system according to claim 1, wherein the function valve is formed as a first valve section and first actuator valve is formed as a second valve section; and wherein the first valve section and the second valve section are arranged together as an integrated valve unit.

6. The hydraulic system according to claim 1, the system further wherein a second actuator valve is coupled to the first input port and is configured to adapt a third opening area of the second actuator valve dependent on a third control signal; and wherein the maximum adaptable size of the second opening area is smaller than the maximum adaptable size of the third opening area.

7. A valve, comprising:
a first actuator port configured to provide or receive hydraulic fluid from a hydraulic actuator;
a second actuator port configured to provide or receive hydraulic fluid from a hydraulic actuator;
an actuator valve port configured to provide or receive hydraulic fluid to an actuator valve;
a tank port configured to provide or receive hydraulic fluid to/from a tank;
a valve spool configured to direct fluid between a first function port and a second function port or between the first function port and a third function port of a function valve dependent on a longitudinal positions; and
a valve servo unit configured to move the valve spool along the longitudinal axis dependent on a control signal.

8. The valve according to claim 7, wherein the function valve is formed as a valve section configured to be arranged together with other valve sections as an integrated valve unit.

9. The valve according to claim 7, wherein the valve spool is configured to direct fluid between the first function port and the second function port when positioned at a first position.

10. The valve according to claim 7, wherein the valve spool is configured to direct fluid between the first function port and the third function port when positioned at a second position.

11. The valve according to claim 7, wherein the function valve further comprises:
a fourth function port configured to be coupled to an actuator valve;
a fifth function port is coupled to or configured to be coupled to a dampening accumulator; and
wherein the valve spool is further configured to direct fluid between the first function port and the third function port and to direct fluid between the at the fourth function port and the fifth function port when positioned at a third position.

12. A valve assembly, comprising:
a shunt valve configured to adapt an first opening area between a first input port and a first output port of the shunt valve dependent on a first control signal, the first input port being connectable to a pump and the first output port being connectable to a tank;
a first actuator valve coupled to the first input port and configured to adapt a second opening area of the first actuator valve dependent on a second control signal, the first actuator valve being attachable to a first hydraulic actuator; and
a function valve including a first function port connectable to the first hydraulic actuator, a second function port coupled to a second actuator port of the first actuator valve, a third function port connectable to the tank, a fourth function port coupled to the first actuator port of the first actuator valve and a fifth function port connectable to an dampening accumulator, the function valve being configured to direct fluid received at the first function port to the second function port or to the third function port of the function valve dependent on a fourth control signal and being configured to direct fluid received at the at the fourth function port of the function valve to the fifth function port of the function valve or to block fluid received at the at the fourth function port dependent on the fourth control signal.

13. The valve assembly according to claim 12 wherein a hydraulic valve control unit is connected to the shunt valve, the first actuator valve ant the function valve and is configured to
determine the first opening area value and the second opening area value based on user input data and a predetermined relation dependent on the user input data, and
sending the first control signal, indicative of the first opening area value,
sending the second control signal indicative of the second opening area value and the fourth control signal.

14. The valve assembly according to claim 12, wherein the function valve is formed as a first valve section and first actuator valve is formed as a second valve section; and wherein the first valve section and the second valve section are arranged together as an integrated valve unit.

15. The valve assembly according to claim 12, wherein a second actuator valve is coupled to the first input port and is configured to adapt a third opening area of the second actuator valve dependent on a third control signal; and wherein the maximum adaptable size of the second opening area is smaller than the maximum adaptable size of the third opening area.

16. The valve assembly according to claim 12, wherein the shunt valve and the first actuator valve are arranged separately relative to each other.

17. The valve assembly according to claim 12, wherein the first actuator valve and a second actuator valve are coupled to the first input port using a common connection.

\* \* \* \* \*